US012497809B2

(12) United States Patent
Nava et al.

(10) Patent No.: US 12,497,809 B2

(45) Date of Patent: Dec. 16, 2025

(54) PRE-MOUNTED LOCK FOR A DOOR OF A LOW VOLTAGE ENCLOSURE

(71) Applicant: ABB S.p.A., Milan (IT)

(72) Inventors: Giuseppe Nava, Ponte Lambro (IT); Marco Arienti, Carate Brianza (IT); Cristiano Maggi, Civate (IT)

(73) Assignee: ABB S.p.A., Milan (IT)

(*) Notice: Subject to any disclaimer, the term of this patent is extended or adjusted under 35 U.S.C. 154(b) by 326 days.

(21) Appl. No.: 18/171,451

(22) Filed: Feb. 20, 2023

(65) Prior Publication Data

US 2023/0265696 A1 Aug. 24, 2023

(30) Foreign Application Priority Data

Feb. 23, 2022 (EP) .................................... 22158179

(51) Int. Cl.

| | |
|---|---|
| ***E05C 9/00*** | (2006.01) |
| ***E05C 9/06*** | (2006.01) |
| ***E05C 9/22*** | (2006.01) |
| ***H02B 1/30*** | (2006.01) |

(52) U.S. Cl.

CPC ................ *E05C 9/008* (2013.01); *E05C 9/06* (2013.01); *E05C 9/22* (2013.01); *H02B 1/30* (2013.01)

(58) Field of Classification Search

CPC ......... E05C 9/008; E05C 9/04–08; E05C 9/22

USPC .......................................................... 312/222

See application file for complete search history.

(56) References Cited

U.S. PATENT DOCUMENTS

| | | | |
|---|---|---|---|
| 3,670,537 A | 6/1972 | Horgan, Jr. | |
| 3,910,612 A | 10/1975 | Guiraud | |
| 4,165,894 A | 8/1979 | Wojciechowski | |
| 5,934,719 A * | 8/1999 | Athanasios | E05B 65/087 292/145 |
| 5,970,757 A | 10/1999 | Ramsauer | |
| 6,086,121 A | 7/2000 | Buckland | |

(Continued)

FOREIGN PATENT DOCUMENTS

| | | |
|---|---|---|
| DE | 19700440 C1 | 5/1998 |
| EP | 0035175 A1 | 9/1981 |
| EP | 1045098 A1 | 10/2000 |

(Continued)

OTHER PUBLICATIONS

Extended European Search Report for European Application No. 22158179.6, dated Aug. 16, 2022, 7 pages.

(Continued)

*Primary Examiner* — Christine M Mills
*Assistant Examiner* — Yahya Sidky
(74) *Attorney, Agent, or Firm* — McCarter & English, LLP; Michael M. Gnibus

(57) ABSTRACT

Described herein is a pre-mounted lock assembly for a door of a low and medium voltage electrical cabinet including a containment profile that develops along a main direction defining a seat. A mechanism is arranged in said seat. Said mechanism includes at least a rod and at least one guide element for said rod. Said guide element is rigidly connected to said profile. The pre-mounted lock assembly also includes fixing means for fixing it to said door following the connection of said at least one guide element to said profile, wherein said fixing means are arranged on said profile and/or on said at least one guide element.

18 Claims, 14 Drawing Sheets

(56) References Cited

U.S. PATENT DOCUMENTS

2020/0032562 A1* 1/2020 Horwood ................ E05C 9/047

FOREIGN PATENT DOCUMENTS

| | | | |
|---|---|---|---|
| EP | 1245766 | A1 | 10/2002 |
| EP | 1736626 | A2 | 12/2006 |
| EP | 2843781 | A1 | 3/2015 |
| FR | 2378930 | A1 | 8/1978 |
| FR | 2646871 | A1 | 11/1990 |
| FR | 2745322 | A1 | 8/1997 |
| FR | 2800117 | A1 | 4/2001 |
| FR | 3066521 | A1 | 11/2018 |
| GB | 2055137 | A | 2/1981 |
| JP | 2009280995 | A | 12/2009 |

OTHER PUBLICATIONS

European Search Report for European Application No. EP13181973, dated Jan. 13, 2014, 2 pages.

French Preliminary Research Report for French Application No. FR1754467, dated Jul. 2, 2018, 2 pages.

European Search Report for European Application No. EP02075785, dated Jul. 6, 2002, 2 pages.

* cited by examiner

FIGURE 4B
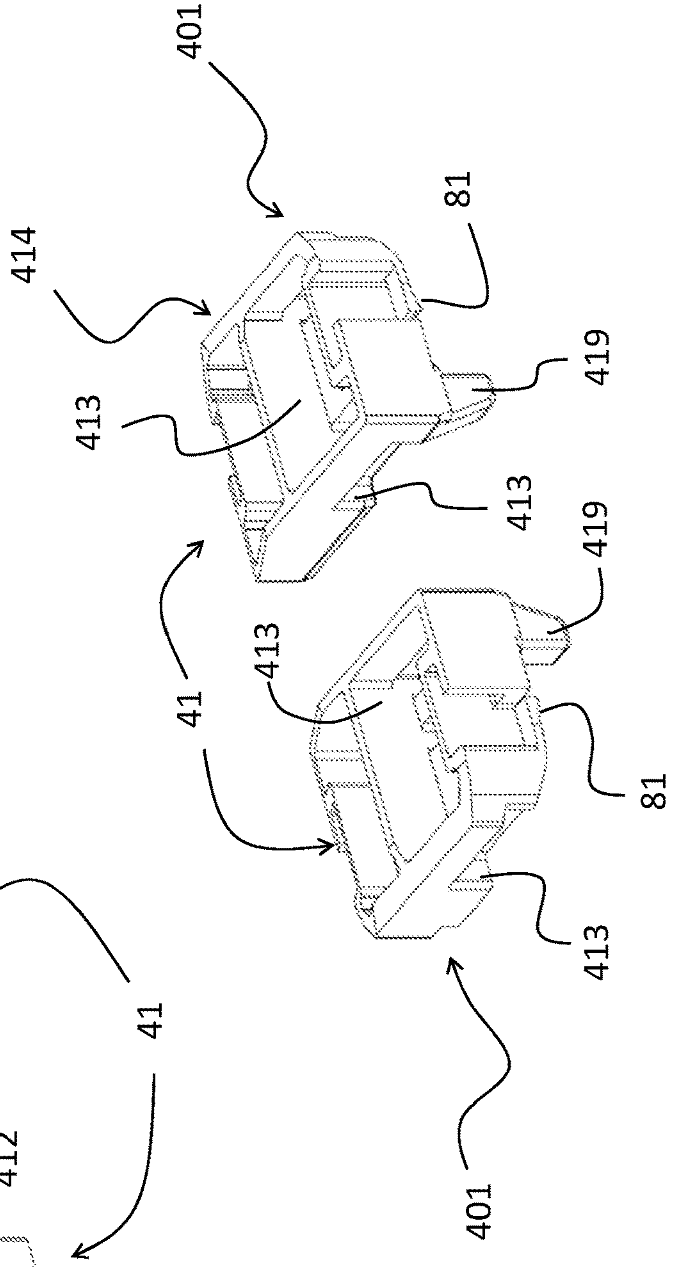
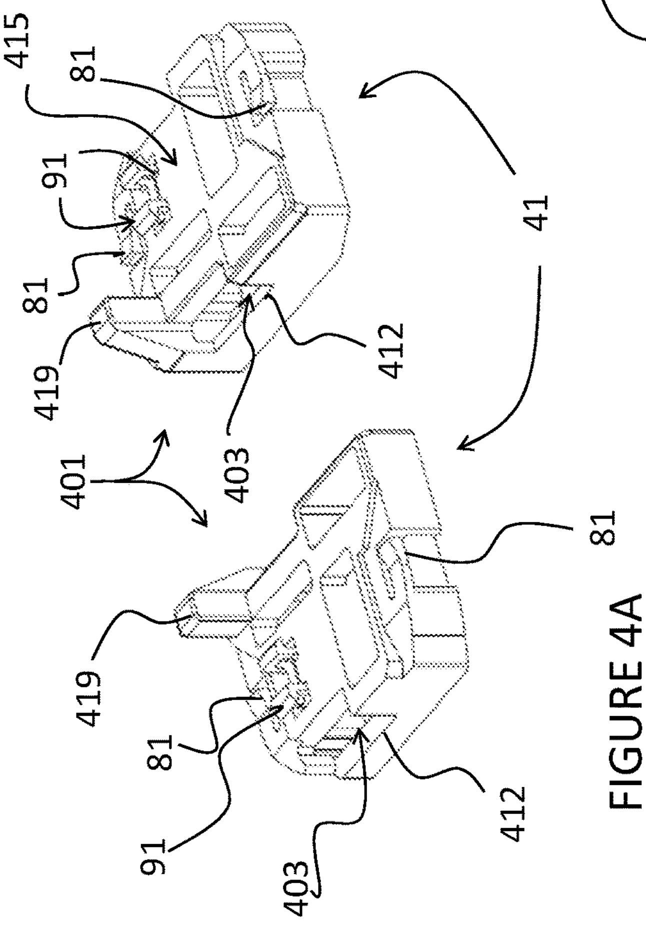
FIGURE 4A

300

PRE-MOUNTED LOCK FOR A DOOR OF A LOW VOLTAGE ENCLOSURE

CROSS-REFERENCE TO RELATED APPLICATIONS

This application claims priority to European Patent Application No. 22158179.6, filed Feb. 23, 2022, and titled "PRE-MOUNTED LOCK FOR A DOOR OF A LOW VOLTAGE ENCLOSURE", the entire contents of which are hereby incorporated by reference in their entirety.

BACKGROUND

The present disclosure relates to the manufacturing of low and medium voltage electrical enclosure; in particular the present disclosure relates to a pre-mounted lock assembly for a door of a low and medium voltage electrical enclosure. The present disclosure also relates to a door including such pre-mounted lock assembly and an enclosure including such a door.

Generally, an enclosure for low and medium voltage electrical distribution is a well-known equipment formed by a supporting structure delimited by lateral, rear, top and bottom walls and closed by a door, which houses in one or more internal compartments electrical apparatuses and equipment, such as, e.g., circuit breakers and/or similar devices, a bus-bar system, electrical instruments, and similar devices.

The enclosure also includes a lock assembly for closing and opening the door. Such a lock assembly includes a mechanism that can be switched between a first configuration and a second configuration by means of an activation lever. In the first configuration, a first engagement element of the mechanism interacts with a second engagement element of the supporting structure so as to keep the door in a closing position. When the mechanism is switched in the second configuration, the two engagement elements are mutually released and the door can be opened.

BRIEF DESCRIPTION

FIG. 1 shows an embodiment of a lock assembly of a cabinet door according to the prior art. In particular, FIG. 1 shows the components of the lock mechanism that is activated by a lever (not shown). The mechanism is installed on a side of the door 200 and includes two longer rods 201 guided by corresponding guide elements 204. The mechanism also includes a shorter rod 202 guided by a central guide element 206. The shorter rod is placed between the two lover rods 201 and connected therewith so as a movement imposed to the shorter rod, by means of the activation lever, is transmitted to the longer rods. On this regard, depending on the activation principle of the mechanism, the longer rods are moved in the same direction or in an opposite direction by the movement of the activation lever. Typically, at their free end, the longer rods are configured so as to engage a fixed element connected to the supporting structure when the mechanism is switched in the closing configuration.

It has been noted that the lock assembly installation operations are particularly complex. First, each guide element of the mechanism above is screwed to the door with the corresponding rods so as to form the mechanism structure. Then, a cover profile 205 is installed above the mechanism so as to protect it. More precisely, the cover profile is screwed to the door in order to fix stably it. A safety stopper is provided at each end of the profile in order to close longitudinally the profile. Overall, these operations are time consuming and consequently they impact in term of manufacturing costs.

Further, it has to be noted that, in view of the steps required, the lock assembly must be necessarily installed along the production line of the cabinet door. At the end of such a production line, the presence of the lock assembly increases the thickness of the door at one of its sides. That limits the transport possibilities thereof.

In view of the above consideration, there is clearly the need to provide a new technical solution that allows to overcome the above disadvantages.

The present disclosure is aimed at providing a technical solution that allows to overcome the above drawbacks. In particular the present disclosure is aimed at providing a lock assembly which make easier and faster its installation to a door side. Within this aim, a purpose of the present disclosure is to provide a lock assembly that can be installed to the door also outside the production line thereof. Another purpose of the present disclosure is to provide a lock assembly that does not impact on the transport of the door, but rather it makes such a transport easier. Not the last purpose of the present disclosure is to provide a lock assembly that is reliable and easy to manufacture at competitive costs.

The aim and the purposes above are reached by means of a pre-mounted lock assembly for a door of a low and medium voltage electrical cabinet, wherein said lock assembly includes a:

- a containment profile that develops along a main direction defining a seat;
- a mechanism housed in said seat, wherein said mechanism includes at least a rod and at least one guide element for said rod, wherein said at least one guide element is rigidly connected to said profile, and
- fixing means for fixing said lock assembly to said door following the connection of said at least one guide element to said profile, wherein said fixing means are installed on said profile and/or on said at least one guide element.

According to a possible embodiment, the said at least one guide element is connected to said profile by means of first snap-fit means.

According to possible embodiment, said fixing means comprising second snap-fit means.

According to a possible embodiment, said containment profile includes a curved portion and two flat portions that develop on a same plane from opposite regions of said curved portion, said flat portions being separated so that an opening is defined therebetween for the insertion of said mechanism in said seat.

Said opening may include at least one enlargement for the insertion of one or more guide elements of said at least one rod.

According to a possible embodiment, said mechanism includes a first rod, a second rod and a third rod that connects the first rod to the second rod; the first rod and the second rod include a through slot defined close to an end proximal to said third rod, said through slot being configured so as to be engaged by a bent end of said third rod.

Said mechanism may include a plurality of guide elements for each of the rods.

According to a possible embodiment, at least one of said guide element includes a body defining a longitudinal cavity through which a corresponding rod can be inserted, said body including first surfaces that make it and said rod mutually slidable after their placement in said seat of the profile; said body including second surfaces that guide laterally said rod with respect to said body, and vice versa.

According to a possible embodiment, the body includes an internal side and an external side mutually opposed, wherein connecting means for connecting said guide element to said profile are arranged on said external side of said body. Said connecting means may include a couple of first snap-fit connectors each of which configured to engage with a corresponding slot defining through said profile.

According to a possible embodiment, the fixing means for fixing the lock assembly to the door are arranged on the external side of said body of said guide element, wherein said fixing means include second snap-fit connectors configured to engage in a corresponding slot defined through a door on which the pre-mounted lock assembly will be installed.

According to a further embodiment, the body of the guide element also includes an alignment element protruding from its external side for contacting a fixed alignment element arranged on the supporting structure of said enclosure.

The present disclosure also relates to a door for a low voltage enclosure characterized in that it includes a pre-mounted lock assembly according to one or more of the embodiments above. The present disclosure also relates to a low voltage enclosure characterized in that it includes such a door.

BRIEF DESCRIPTION OF THE DRAWINGS

Further features and advantages of the present disclosure will be clearer from the description of preferred but not exclusive embodiments of a low and medium voltage electrical enclosure according to the present disclosure, shown by way of examples in the accompanying drawings, wherein:

FIGS. 4A and 4B are perspective views from different points of view of a first pair of components of the lock assembly of FIG. 1;

Figure 1:
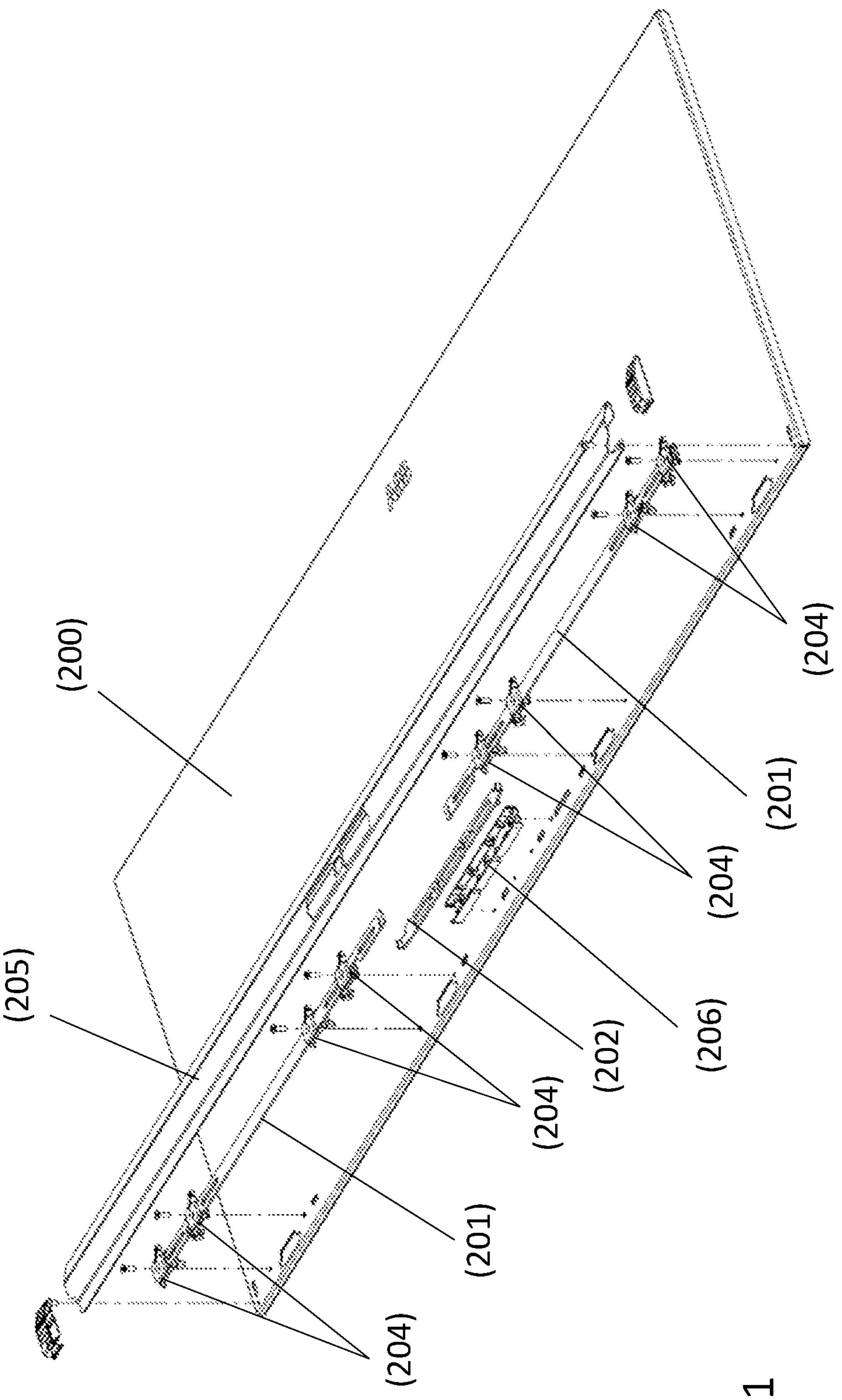
FIG. 1 is an exploded view of a door of an embodiment of a door of an according to a prior art solution.

With reference to the attached FIGS. 2-12B, the present disclosure relates to a pre-mounted lock assembly that is indicated with the reference number 1 in the attached figures. Hereinbelow the expression "lock assembly 1" or "assembly 1" are also used for indicating the pre-mounted lock assembly 1. The lock assembly 1 is intended to be installed on a door of a low-voltage enclosure (or cabinet) to open and close thereof.

DETAILED DESCRIPTION

According to the present disclosure, the pre-mounted lock assembly 1 includes a containment profile 10 (or profile 10) that develops along a main direction 101 so as to define an internal seat 15 in which a mechanism 20 is accommodated. The mechanism 20 is activated by a lever 25 (shown in FIG. 8) according to a principle know per se.

Figure 2:
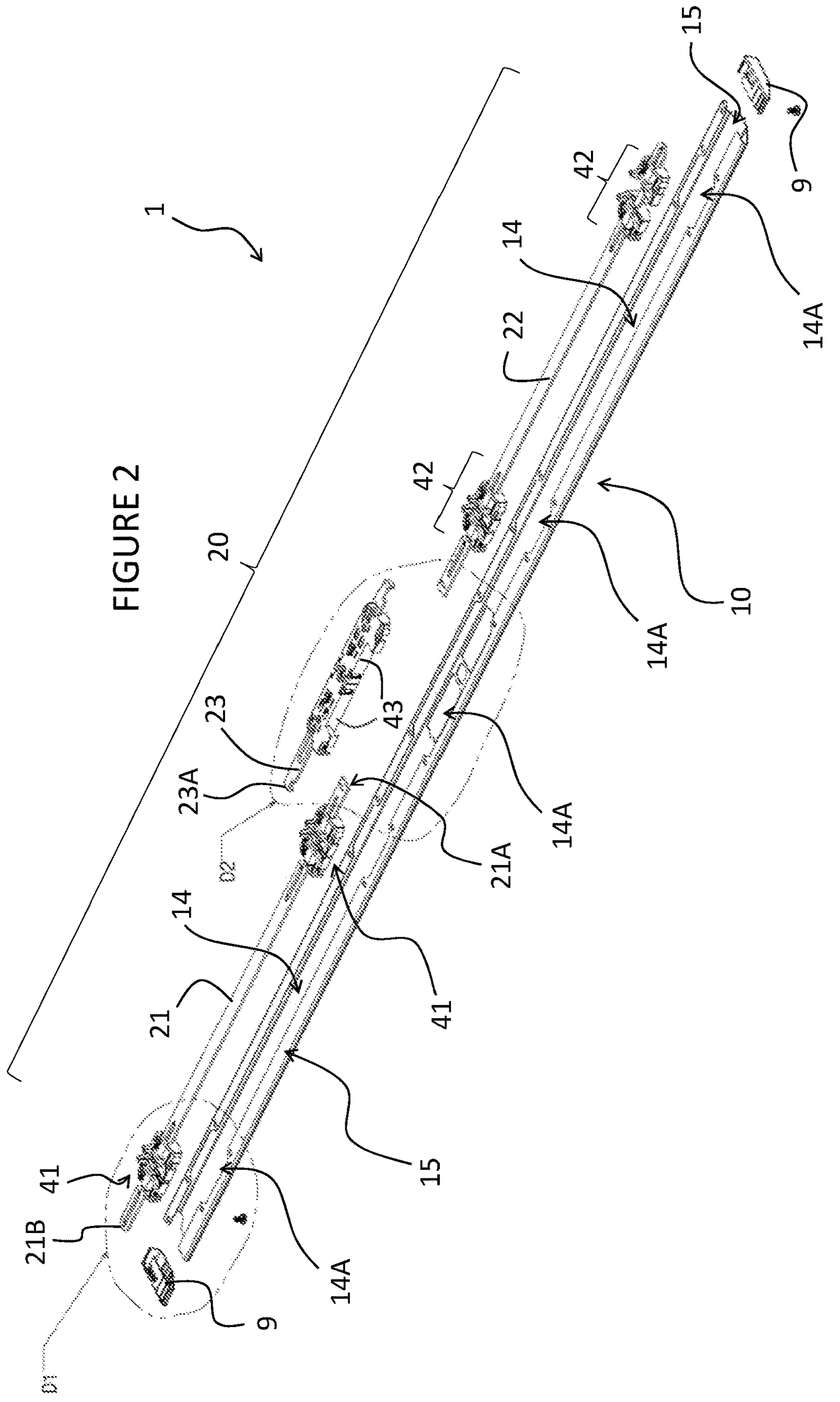
FIG. 2 is a perspective exploded view of a pre-mounted lock assembly according to the present disclosure.

FIG. 2 is an exploded view showing the components of the pre-mounted lock assembly 1 according to a possible, not exclusive, embodiment of the present disclosure. The mechanism 20 includes a plurality of rods 21, 22, 23 and a plurality of guide elements 41, 42, 43 for each of the rods 21, 22, 23. More precisely, in the embodiment shown in the figures, the mechanism 20 includes a first rod 21, a second rod 22 and a connecting rod 23 (or central rod 23) for connecting the first rod 21 to the second rod 22 so that a movement of the connecting rod 23, in a direction, translates in a movement of the other rods 21, 22. Hereinbelow, the first rod 21 and the second rod 22 are indicated also with the expression "external rods 21,22" and the connecting rod 23 is indicated also with the expression "central rod 23".

As shown in the figures, each of the rods 21, 22, 23 is flat and it has a rectangular cross section considered on a reference plane orthogonal to the direction along which it develops, i.e., orthogonal to the main direction 101 when the mechanism 20 is placed in the seat 15 of the profile 10. However, the rods 21, 22, 23 could have a different configuration both in term of cross section shape and in term of general shape (i.e., the rods could be "not flat").

Each rod 21, 22, 23 may include a through slot 21', 22' defined close to their end 21A-22A closest to the central rod 23. Such a second slot 21', 22' is configured so as to be engaged by a corresponding bent end 23A-23B of the of the central rod 23 (see FIG. 6). When the bent ends 23A, 23B engage the second through slot 21', 22' of the external rods 21, 22 then the three flat rods 21, 22, 23 are connected and move together along the main direction 101.

Figure 12B:
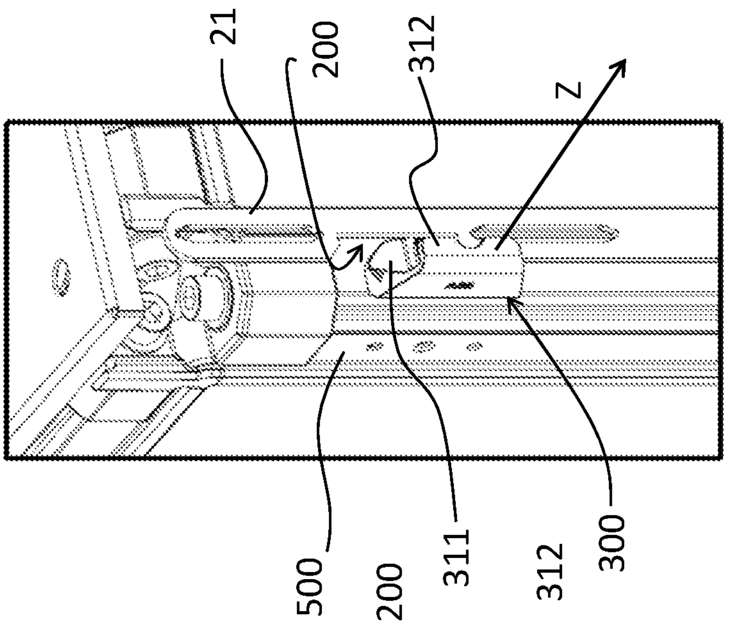
FIGS. 12A and 12B are views relating to the operation of a lock assembly according to the present disclosure.
Figure 12A:
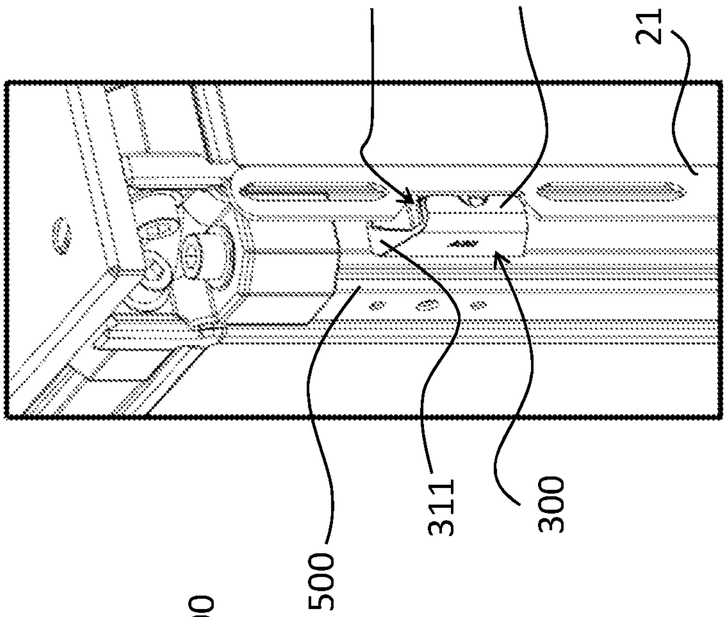
Figure 12:
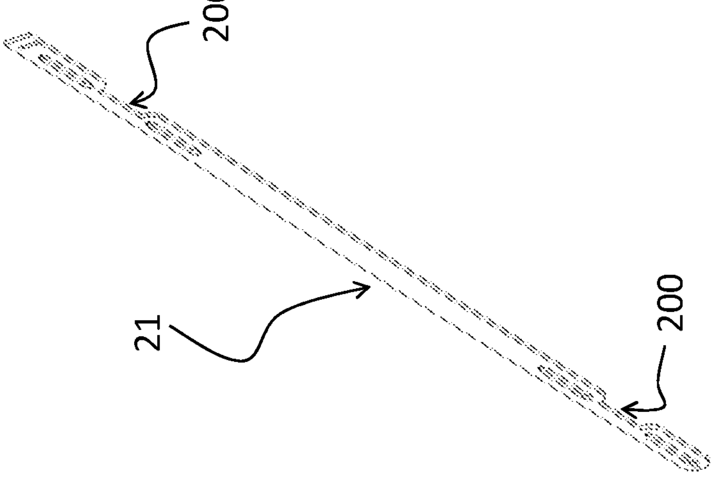
FIG. 12 is a perspective view of a component of a lock assembly according to the present disclosure.

FIG. 12 shows in detail the configuration of the first rod 21. The same configuration is also provided for the other external rod, namely the second rod 22. As shown, the first rod 21 includes at least a lateral recess 200 which is involved in the locking of the door 2 to the supporting structure 500 of the cabinet, according to a working principle better explained below with reference to FIGS. 12A and 12B.

According to one embodiment of the profile 10, includes a curved portion 10A and two flat portions 10B that develop on the same plane from opposite parts of the curved portion 10A.

Overall, these cited portions 10A, 10B define an open cross section having a substantially C-shape, wherein said cross section is considered on a plane orthogonal to the main direction 101 above defined. Such a cross section defines the shape of the seat 15 of the profile 10.

The flat portions 10B are separated on their development plane so that a longitudinal opening 14 is defined therebetween for the insertion of the components of the mechanism 20 (i.e., the rods 21, 22, 23 and the guide elements 41, 42, 43) the internal seat 15 of the containment profile 10. On this regard, the distance between the two flat portions 10B is not constant along the main direction 101, but it is greater in some regions so as to define a plurality of enlargements 14A each of which suitable for the insertion of one or more guide elements 41, 42, 43 of the rods 21, 22, 23 according to a principle better explained below.

According to a preferred embodiment shown in the figures, each of the external rods 21, 22 is supported by two pairs of guide elements 41, 42. Instead, the central rod 23 is supported by a sole pair of guide elements 43. However, in alternative embodiments (not shown in the figures) one or more of the cited rods 21, 22, 23 could be supported and guided by a sole guide element or alternatively by more than two pairs of guide elements.

The guide elements 41 may be provided for supporting and guide the first rod 21 have the same structure of the guide elements 42 provided for supporting and guide the second rod 22.

Hereinbelow, reference is made to the guide elements 41 of the first rod 21, but the technical solutions disclosed are valid also for the guide elements 42 provided for the second rod 22.

Figure 4:
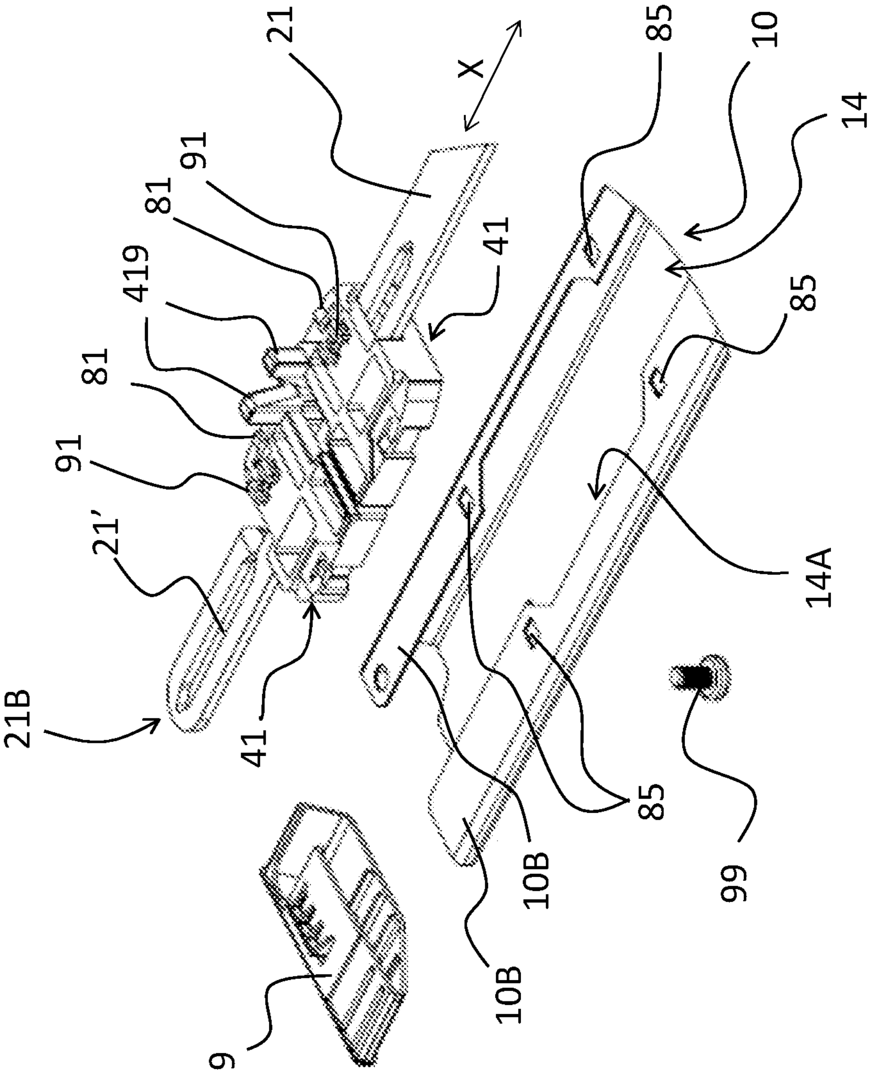
FIG. 4 is an enlargement view of the detail D1 of FIG. 2.

FIGS. 4A and 4B show an embodiment of a pair of guide element 41 usable for supporting the first rod 21. Each guide element 41 includes a body 401 defining a longitudinal cavity 403 through which the first rod 21 can be inserted. On this regard, the body 401 defines a plurality of first surfaces 412 that make the body 401 and the first rod 21 mutually slidable after their placement in the seat 15 of the profile 10. In other words, the first surfaces 412 define a sort of sliding plane for the two components (guide element 41 and first rod 21). The body 401 also includes a plurality of second surfaces 413 that guide laterally the first rod 21 with respect to the body 401, and vice versa, defining a mutual sliding direction X (see FIG. 4) between the two components at issue (guide element 41 and first flat rod 21).

The body 401 defines an internal side 414 and an external side 415 that are mutually opposed.

The term "internal" wants to indicate the surfaces of the body 401 address to face the internal surfaces of the containment profile 10, i.e., the profile surfaces defining the seat 15. The term "external" intends to indicate the opposite side.

The guide element 41 may include connecting means for connecting the guide element 41 to the profile 10. In the embodiment shown in FIGS. 4A and 4B, the connecting means are provided on the external side 415 of the body 401 and include a couple of first snap-fit connectors 81 each of which configured to engage in a corresponding slot 85 defining through one of the flat portions 10B of the profile 10 (see for example FIG. 4). The two snap fit connectors 81 may be placed on opposite parts of the body 401 with respect to the longitudinal cavity 403.

The guide element 41 also may include fixing means for connecting the lock assembly 1, after its assembling, to the door 2 on which the assembly 1 is installed. In the embodiment shown in the figures, the fixing means include second snap-fit connectors 91 configured to engage in a corresponding slot 95 defined through the door 2 on which the premounted lock assembly 1 will be installed.

In the embodiment shown in the figures, two second snap-fit connectors 91 are provided on the external side 415 of the body 401. Such a connectors 91 are of cantilever type. The two connectors 91 are specular with respect to a plane orthogonal to the slide direction 101. The two connectors 91 engage on opposite edge of the same slot 95 defined through the door 2.

The first snap-fit connectors 81 and the second snap-fit connectors 91 could have a configuration different from that shown in the figures.

Figures 8, 8A:
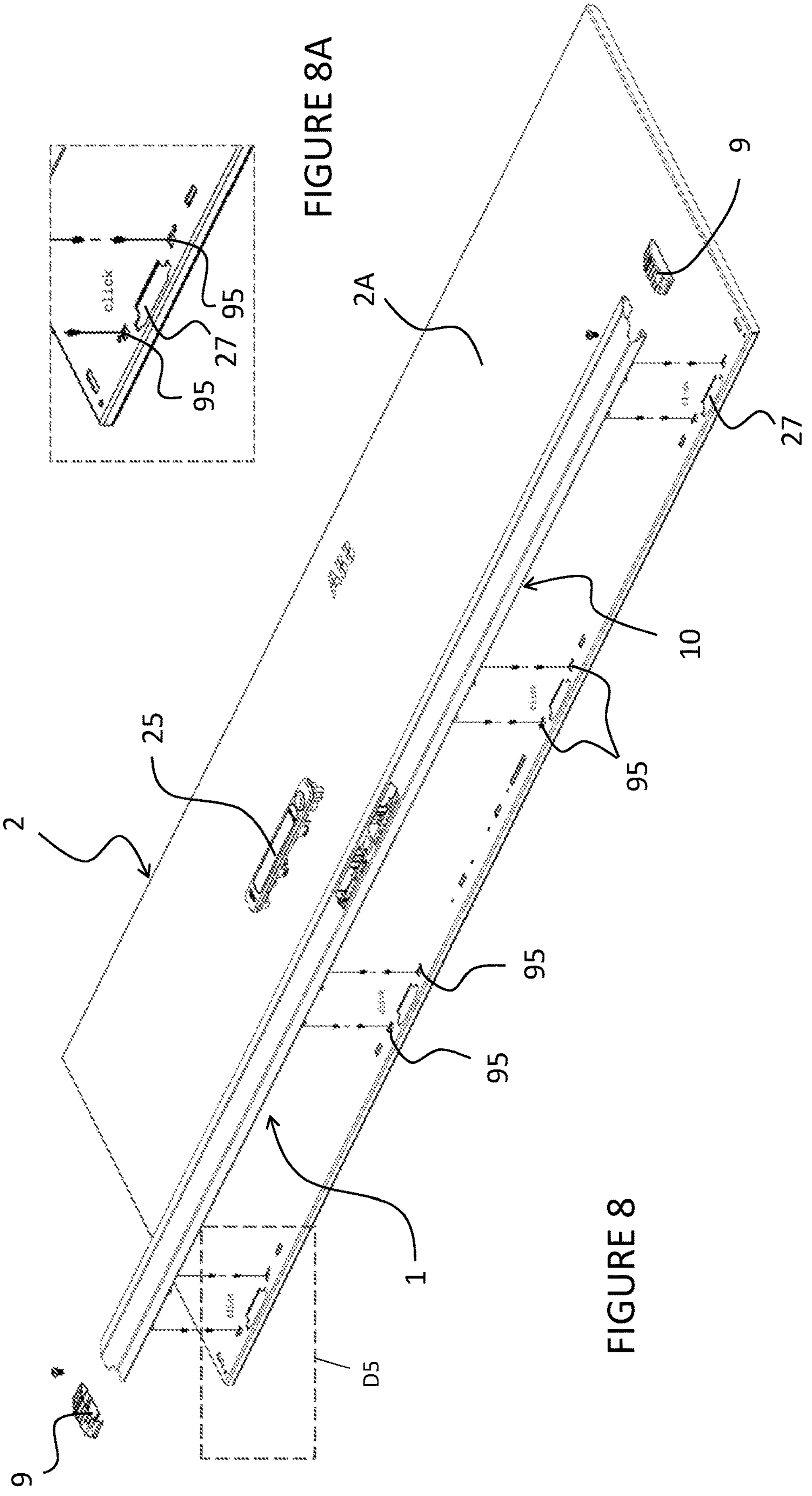
FIGS. 8 and 9 are views, from opposite point of views, relative to an installation step of the lock assembly of FIG. 1 on a door.
FIG. 8A is an enlarged view of the detail D5 of FIG. 8.

As shown in the figures, the body 401 of the guide element may include also an alignment element 419 which protrudes from the external side 415. When the lock assembly 1 is installed on the door 2, then the alignment element 419 protrudes externally through a further slot 27 of the door. As shown in FIG. 8A, such a further slot 27 may be defined between two slots 95 provided for the second snap fit connectors 91 (see FIG. 8A).

The alignment element 419 is provided to contact an alignment surface 300A of a fixed locking element 300 arranged on the supporting structure 500 of the cabinet. As better below indicated, the alignment elements 419 and the alignment surfaces 300A mutually cooperate to keep the door 2 vertically aligned with respect to the supporting structure 500.

Figure 6:
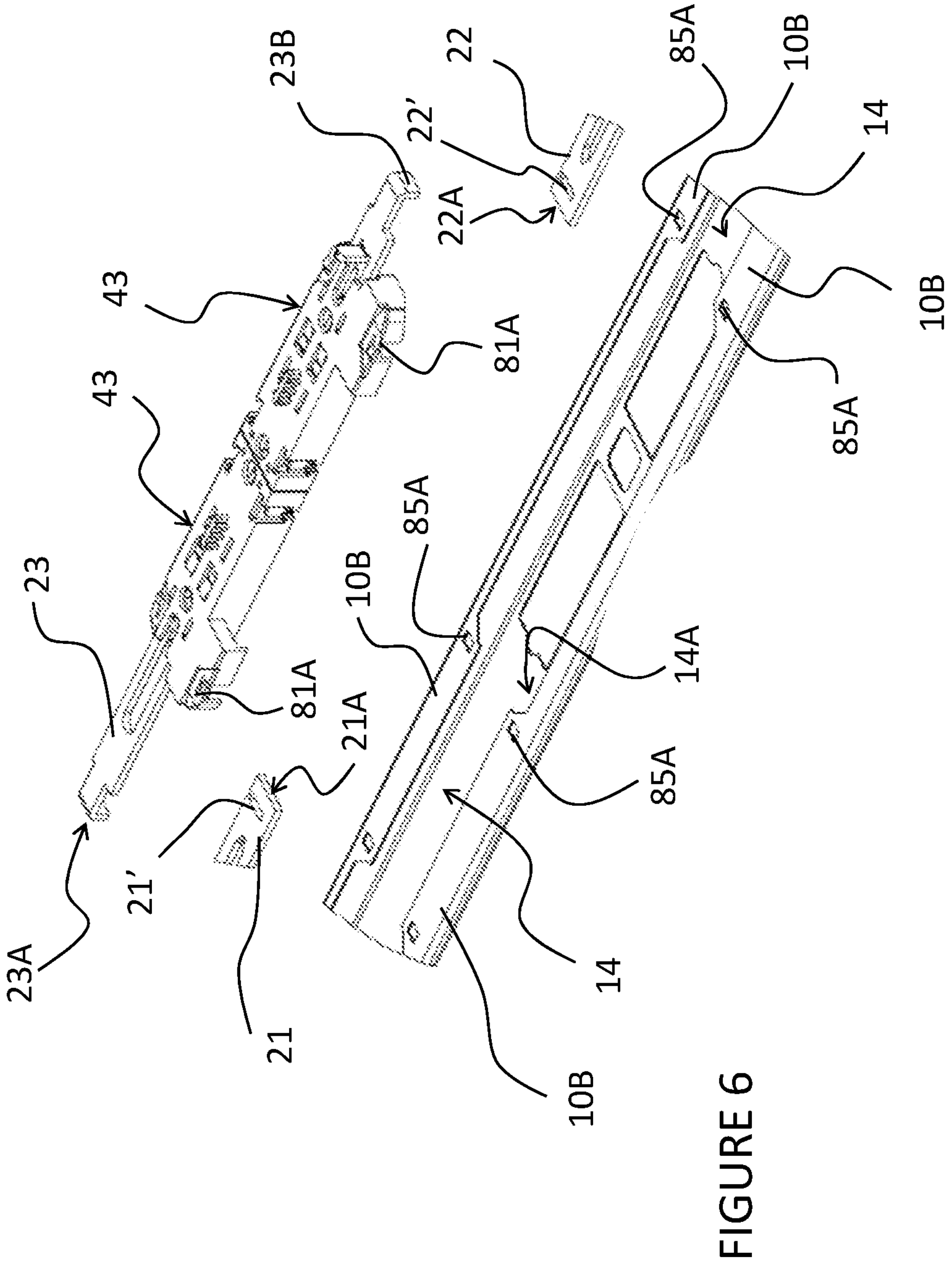
FIG. 6 is an enlargement view of the detail D2 of FIG. 2.
Figures 6A, 6B:
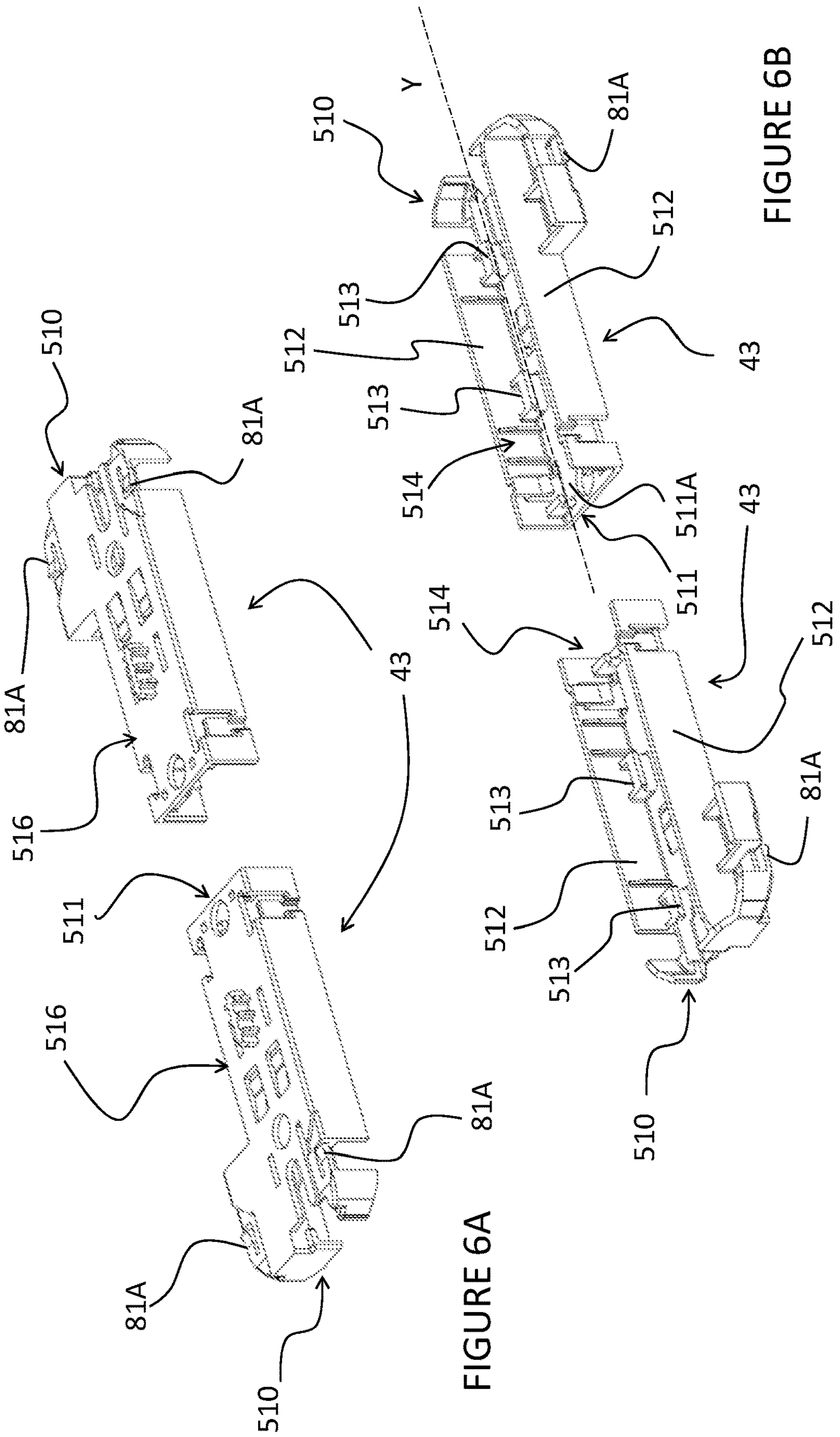
FIGS. 6A and 6B are perspective views from different points of view of a second pair of components of the lock assembly of FIG. 1.
Figure 7:
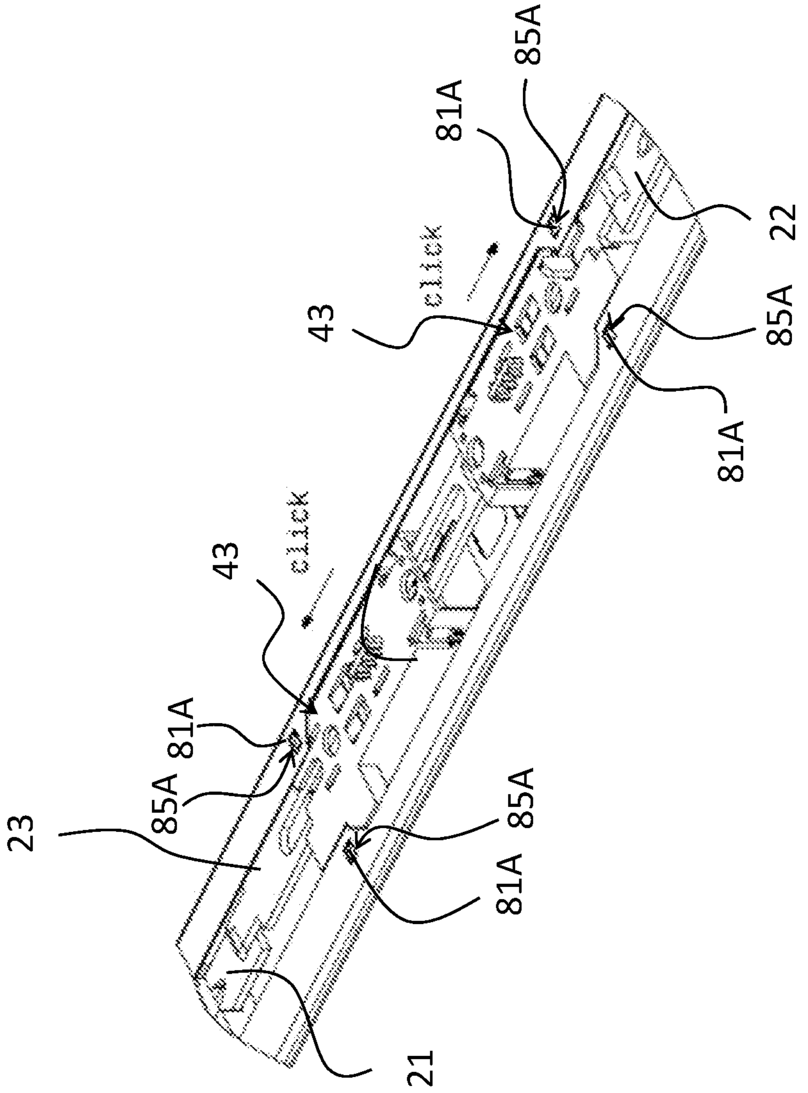
FIG. 7 is an enlargement view of the detail D4 of FIG. 3.

FIGS. 6A and 6B show an embodiment of a pair of guide element 43 usable for supporting the central rod 23, as shown in FIG. 6. From these figures, the structure of the guide element 43 appears clearly different from that of the guide elements 41, 42 provided for supporting the other flat rods 21,22 of the mechanism 20. However, the structure could be different from that shown in the figures and it could be more similar to that provided for the other guide elements 41, 42 of the mechanism.

The guide element 43 of the central rod 23 includes a body 510 having an external side 516 and an internal side 514, wherein the terms "external" and "internal" have the same meaning above indicated. The body 510 develops along a main direction Y and includes a base 511 and two opposite flanks 512. The body 510 has a transversal C-shaped section considered on a section plane orthogonal to the main direction Y. The internal surface 511A of the base 511 is substantially flat so as to the define a sliding plane for the relative movement of the central rod 23 with respect to the body 510 or vice versa. The body 510 includes a plurality rest surfaces 513 that overall define a longitudinal direction for the mutual sliding of the two components (body 510 and central rod 23).

As indicated in the figures, also the guide element 43 of the central rod 23 is provided with snap-fit joints for its connection with the profile 10. As provided for the external guide elements 41, the joints of the central guide elements 43 are two snap-fit connectors 81A that protrude from the external side 516 of the body 510. The two connectors 81A are defined on opposite side of the body 510 each close to a corresponding flank 512. Each of the connector 81A is configured to engage a slot 85A defined through flat edge of the profile 10.

Figure 3:
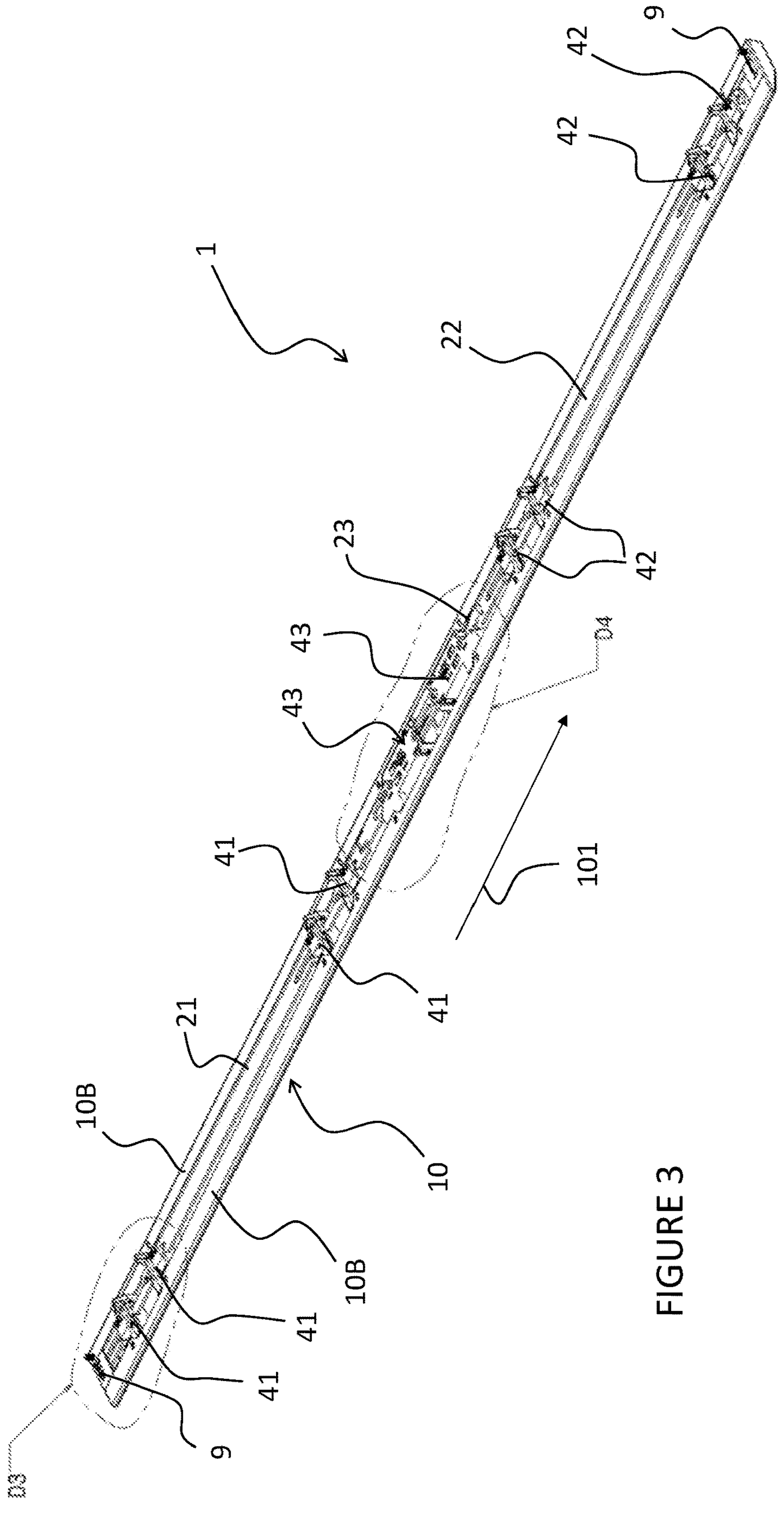
FIG. 3 is a perspective view of the lock assembly of FIG. 1.

With reference in particular to FIGS. 2 and 3, hereinbelow the step for assembling the lock assembly 1 are described.

Firstly, each rod 21, 22, 23 is coupled with the corresponding pair of guide elements 41, 42, 43.

In the case of the first rod 21, for example, it is inserted through the cavity 403 of each of the corresponding guide elements 41. A first and a second pair of guide elements 41 are arranged respectively close to an external end 21B (distal from central rod 23) and to the internal end 21A (proximal to the central rod 23) of the first rod 21. More precisely, for each of said pairs, the guide elements 41 are arranged so as to be specular with respect to a reference plane orthogonal to the direction along which the first rod 21 mainly develops. As shown in FIG. 2, the same arrangement is provided for the two pairs of guide elements 42 of the other external rod 22 and for the guide elements 43 of the central rod 23.

Secondly, the group of components including the first rod 21 and the guide elements 41 is placed into the seat 15 of the containment profile 10 by means of the longitudinal opening above defined. More precisely, each pair of guide elements 41 is inserted in the seat 15 at one of the opening enlargements 14A, while the first rod 21 can be inserted by exploiting the other region (not enlarged) of the longitudinal opening 14. It is worth to notice that the guide elements 41 are inserted in the seat 15 so that the snap fit connectors 81, 91 face outwards.

Analogously, the group of components including the second rod 22 and the relative guide elements 42 is inserted in the seat 15 by means of the opening 14 and the two relative enlargements 14A.

Figure 5:
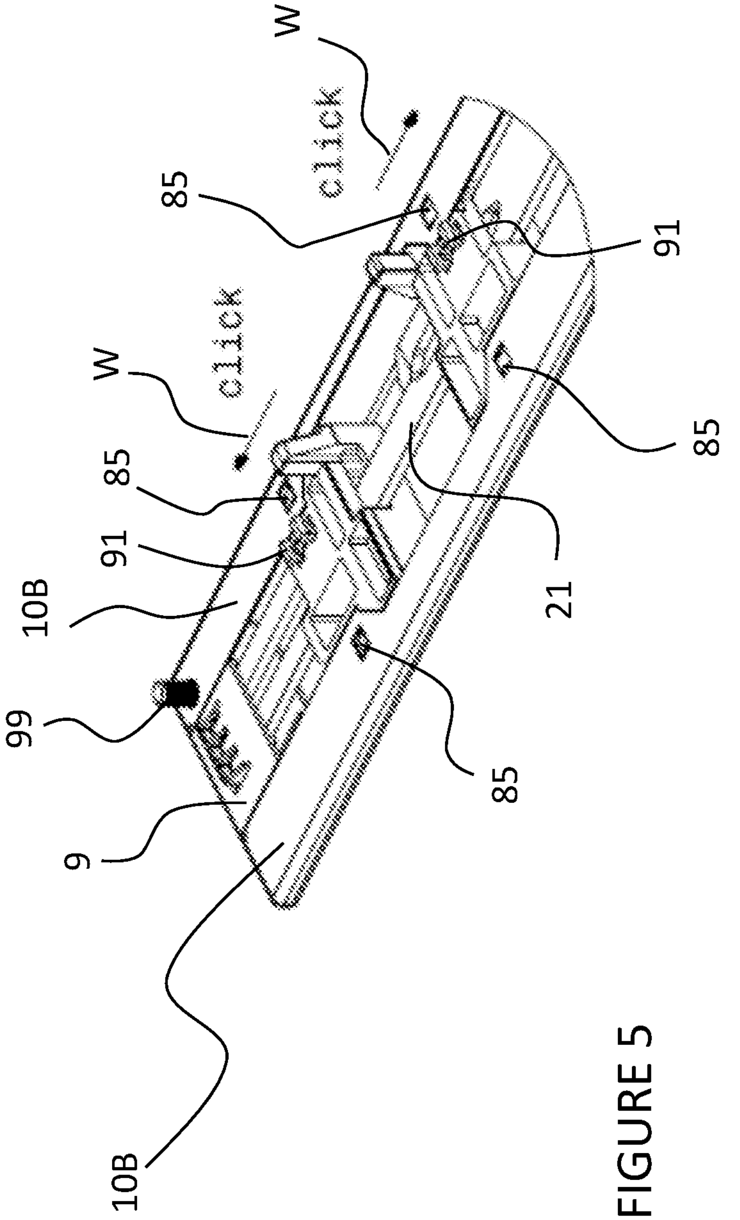
FIG. 5 is an enlargement view of the detail D3 of FIG. 3.

For each of the two group of components 21-41, 22-42 above cited, following their placement in the seat 15, the guide elements 41-42 (of each pair of guide elements 41, 42) are moved mutually away until when their first snap-fit connectors 81 engage a corresponding slot 85 define through the flat portion 10B of the profile 10, i.e., until each guide element 41, 42 reach an engagement condition with the profile 10. On this regard, FIG. 5 shows a pair of guide elements 41 of the first rod 21 in an engagement condition. In such a figure, the two arrows W indicated the movement direction of the two engage elements 41 from an initial position occupied after the placement in the seat 15. The indication "click" in FIG. 5 wants to emphasize the snap-fit action of the connectors 81. The guide elements 42 of the second rod 22 work in the same way.

After or at the same time of the placement of the two groups of components 41-21, 42-22 above cited in the seat 15, the group of components 23-43 including the central rod 23 and the relative pair of guide elements 43 is inserted in the seat 15 by exploiting the central enlargement 14A of the opening 14. In particular, the central rod 23 is inserted by engaging each of its bent ends 23A, 23B in a slot 21', 22' of a corresponding internal end 21A, 22A of the external rods 21, 22.

Also in this case, after their placement in the seat 15, the guide elements 43 of the third rod 23 are moved away until when they reach an engagement condition with the profile 10, namely until each of the snap fit connectors 81A provided on the body 510 engages a corresponding slot 85B defined through the profile 10.

FIG. 3 shows the lock-assembly 1 in its final configuration, namely after the mechanism has been inserted in the seat 15 of the containment profile 10 and after the guide elements 41, 42, 43 of the rods 21, 22, 23 have been rigidly connected to the same profile 10 by means of the snap-fit connectors 81, 81B.

As shown in FIG. 2 or 3, a stopper element 9 may be provided for each end of the containment profile 10. Such a stopper element 9 is longitudinally inserted in the seat 15 and fixed to one of the flat portions 10B of the profile 10 by means of fixing means, such as for example a screw 99. The stopper element 9 avoids that dust, particles or other dirt may enter the seat so as to keep the mechanism effective and reliable. The stopper elements 9 may be inserted in the seat 15 after the lock assembly 1 has been installed on the door 2. However, the stopper elements 9 could be positioned also before the installation of the lock assembly 1.

Figure 9:
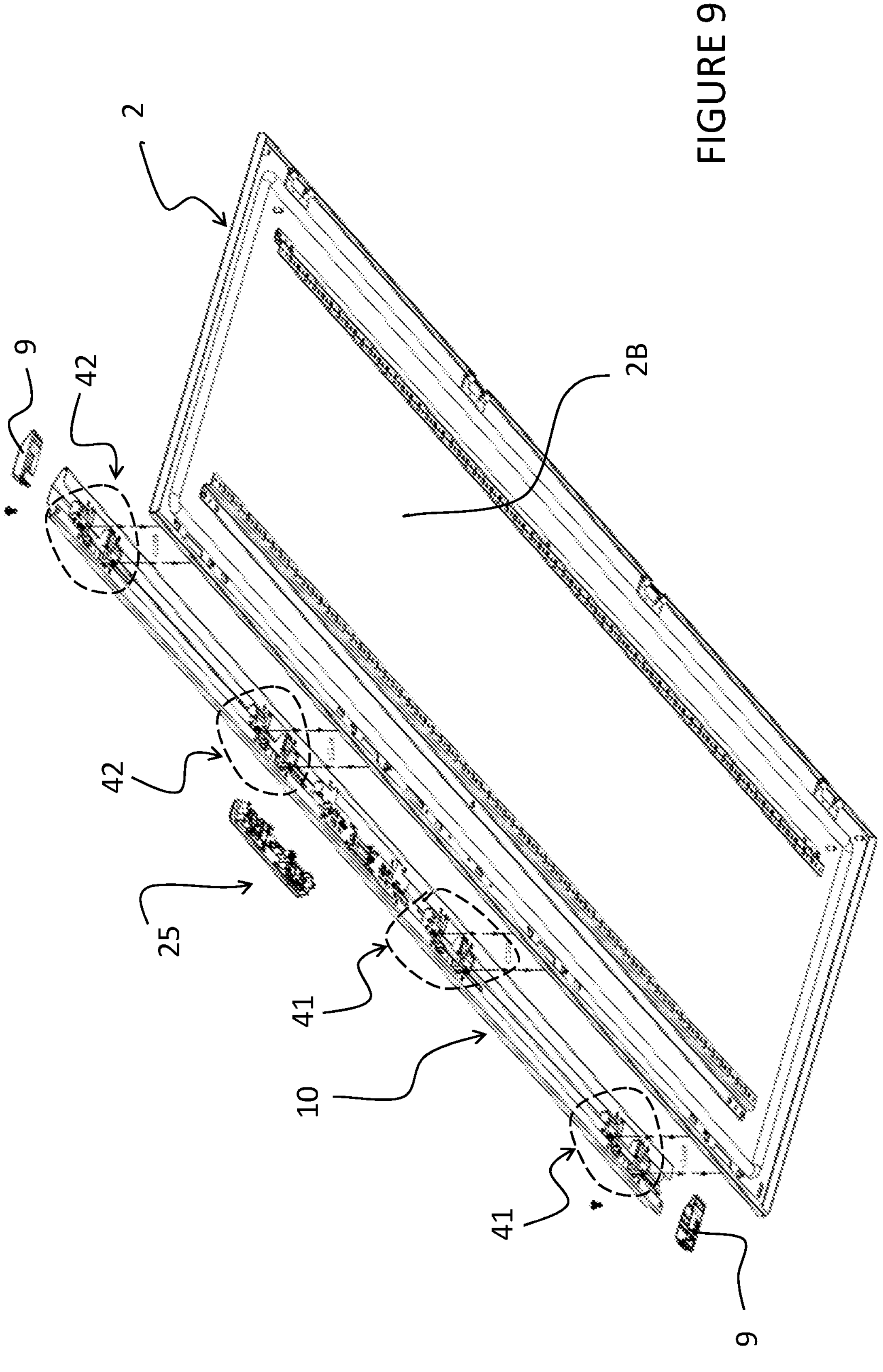

As above mentioned, the present disclosure also refers to a door 2 of a low-voltage cabinet including a lock assembly 1. On this regard, FIGS. 8 and 9 show a door 2 on which a lock assembly 1 according to the present disclosure can be assembled. More in detail, FIGS. 8 and FIG. 9 show respectively the external side and the internal side of the door 1. The term "external" and "internal" refer to a condition of door installed on the supporting structure 500 of an enclosure. In such a condition, the internal side is the one facing the internal space of the cabinet in which the electrical devices/equipment are housed.

As shown in FIGS. 8 and 9, the lock assembly 1 can be connected to the door 2 by means of the second snap-fit connectors 91 protruding from the external side 415 of the body 401 of the guide elements 41, 42 of the external rods 21, 22 of the mechanism 20. In particular, the preassembled lock assembly 1 can be connected by approaching it to the external side 2A of the door 2 so as to align second snap-fit connectors 91 to the corresponding slot 95. Then, by a simple push, each of the second snap-fit connectors 91 engages in the corresponding slot 95.

Therefore, the connection of the lock assembly 1 to the door 2 is very easy and can be actuated also outside the door production line. Further, the lock assembly 1 can be transported without impacting on the overall encumbrance of the door.

Advantageously, the use of snap-fit means ensures a stably connection of the lock assembly 1 to the door 2. However, depending on the configuration of the second snap-fit connectors 91, such a connection could be fixed or advantageously removable.

On this regard, in the embodiment shown in the figure, for example, the snap-fit connectors 91 are configured so as to be disengaged from the corresponding slot 95 by means of a mechanical action on the snap fit connectors 91 from the internal side 2B of the door 2. Indeed, from FIG. 9, it is possible to perceive by intuition that after the installation of the lock assembly 1, the ends of the second snap fit connectors 91 are accessible from the internal side 2B of the door 2.

Therefore, such an end could be disengaged from the slot 95 by a mechanical push actuated by a simple tool, such as for example a screwdriver.

Figure 10:
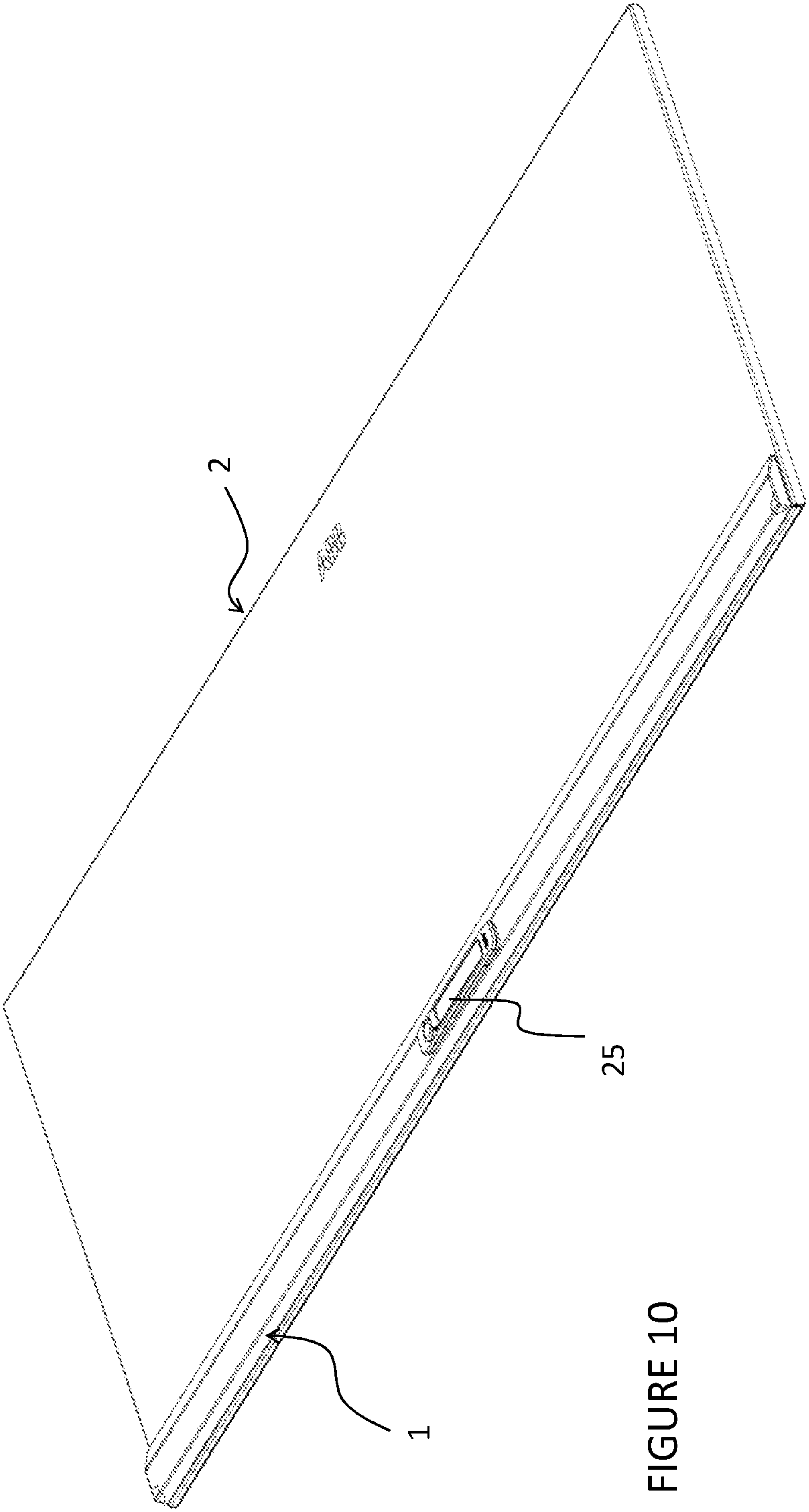
FIG. 10 shows a door on which the pre-mounted lock assembly of FIG. 1 is installed.

FIG. 10 shows the pre-mounted lock assembly 1 fixed on the external side 2A of the door 2. On this regard, the hand activation lever 25 can be connected to the mechanism before the fixing of the lock assembly 1 to the door 2. However, the lever 25 may be installed later so as limit the volume of the packaging containing the lock assembly 1. Further, installing the action lever 25 after the fixing of the lock assembly 1 gives the operator the opportunity to choose freely the side of the door on which proceeding with such a fixing.

Figure 11B:
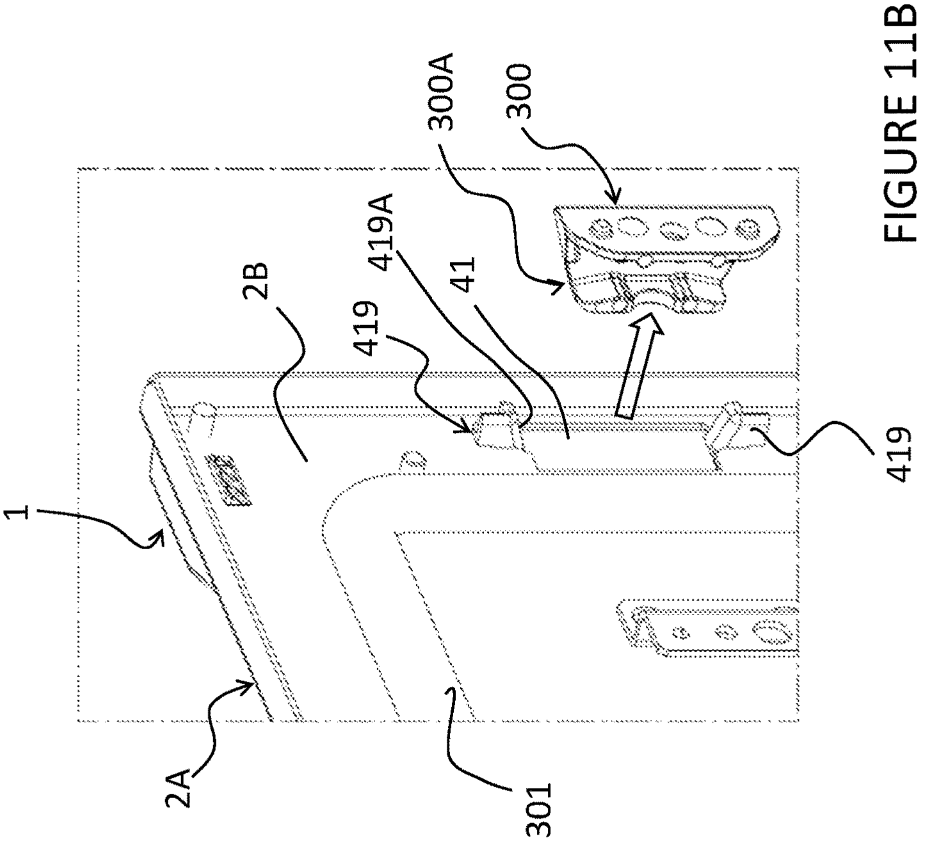
FIGS. 11A and 11B are views, from opposite point of views, of some components of the door.
Figure 11A:
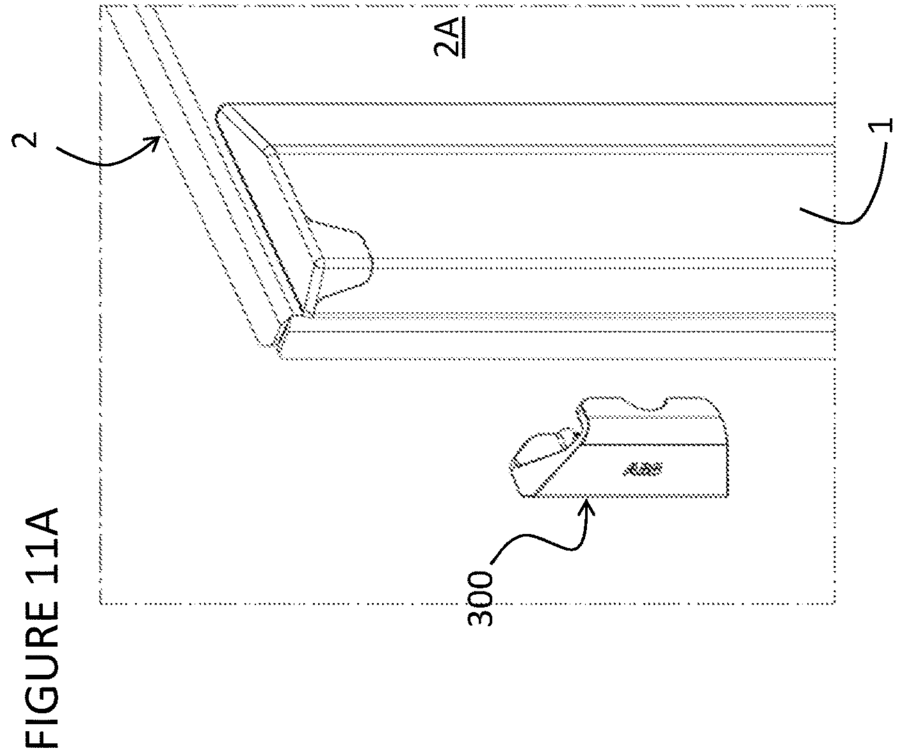

FIGS. 11 and 11B show, from opposite points of view, a corner of the door 2 in FIG. 10. In particular, in these figures, a fixed locking element 300 connected to the supporting structure 500 of the door 2 is shown. FIGS. 12A and 12B allow to understand how the external rods 21, 22 of the mechanism 20 interact with fixed locking element 300 to lock the door 2. On this regard, in FIGS. 12A and 12B, only the external rod 21 is shown while the other components of the mechanism 20 and of the lock assembly 1 are not visualized for clarity.

The door 2 is approached to the supporting structure 500 with the mechanism 20 in its first configuration, namely a configuration for which the external rod 21 (first engagement element) does not interact with the fixed locking element 300 (second engagement element). With reference to FIG. 12A, in this configuration the lateral recess 200 is aligned with the slot 27 predefined through the door 2.

Following the closure movement, the fixed locking element 300 enters the slot 27 as can be perceived by intuition always from FIG. 12A. The fixed locking element 300 is C-shaped with a first surface 311 fixed to the supporting structure 500 and a second surface 312 opposite to the first surface 312. In order to lock the door 2, the external rods 21 is moved, by means of the activation lever 25, along the sliding direction X between the surfaces 311, 312 of the fixed locking element 300. This leads to the locking condition shown in FIG. 12B for which the lateral recess 200 of the external rods 21 is not any more aligned with the slot 27 and with the fixed element locking element 300. Therefore, the latter avoid any opening movement of the door 2 in the direction indicated by the arrow Z.

With reference to FIG. 11B, in any condition, the alignment element 419 of the guide element 41 protrudes from the slot 27 (see FIG. 8) pre-defined through the door 2. When the door 2 is closed, for each of the alignment element 419, a surface 419A thereof contacts a corresponding surface 300A of the fixed locking element 300 so as to keep the door 2 in a stable position. In FIG. 11B, the arrow indicates the approaching direction of the door 2 towards the supporting structure 500 of the cabinet, that is the direction that leads to the contact between the surfaces 419A and 300A just above indicated.

Several variations can be made to the low and medium voltage electrical enclosure thus conceived all falling within the scope of the attached claims. In practice, the materials used and the contingent dimensions and shapes can be any, according to requirements and to the state of the art.

The invention claimed is:

1. A pre-mounted lock assembly for a door of a low and medium voltage electrical cabinet, wherein said pre-mounted lock assembly comprises:

- a containment profile that develops along a main direction defining a seat;
- a mechanism housed in said seat, wherein said mechanism comprises at least one rod and at least one guide element for said at least one rod, wherein said at least one guide element is rigidly connected to said containment profile via at least one first connector; and
- at least one second connector configured to fix said pre-mounted lock assembly to said door following a connection of said at least one guide element to said containment profile,
- wherein said at least one second connector is integral with said at least one guide element, and
- wherein said at least one second connector is configured as a snap-fit connector which engages opposite edges of a slot formed through said door.

2. The pre-mounted lock assembly according to claim 1, wherein the first connector comprises a snap-fit connector.

3. The pre-mounted lock assembly according to claim 1, wherein said containment profile comprises a curved portion and two flat portions that develop on a same plane from opposite regions of said curved portion, wherein said flat portions are separated so that an opening is defined therebetween for the insertion of said mechanism in said seat.

4. The pre-mounted lock assembly according to claim 3, wherein said opening comprises at least one enlargement for the insertion of said at least one guide element of said at least one rod.

5. The pre-mounted lock assembly according to claim 1, wherein said mechanism comprises a first rod, a second rod, and a third rod that connects the first rod to the second rod, wherein the first rod and the second rod comprise a through slot defined close to an end closest to said third rod, said through slot configured so as to be engaged by a bent end of said third rod.

6. The pre-mounted lock assembly according to claim 1, wherein said mechanism comprises a plurality of said at least one guide element, one for each of a plurality of said at least one rod.

7. The pre-mounted lock assembly according to claim 1, wherein said at least one guide element comprises a body defining a longitudinal cavity through which said rod is inserted, said body comprising first surfaces that make said body and said rod mutually slidable after their placement in said seat of said containment profile, said body comprising second surfaces that guide laterally said rod with respect to said body, and vice versa.

8. The pre-mounted lock assembly according to claim 7, wherein said body comprises an internal side and an external side mutually opposed, wherein said first connector is configured to connect said guide element to said containment profile is arranged on said external side of said body.

9. The pre-mounted lock assembly according to claim 8, wherein said first connector comprises a couple of first snap-fit connectors each of which is configured to engage with a corresponding slot defining through said containment profile.

10. The pre-mounted lock assembly according to claim 8, wherein said second connector is arranged on the external side of said body guide element.

11. The pre-mounted lock assembly according to claim 7, wherein said body also comprises an alignment element protruding from its external side for contacting an alignment surface of a fixed locking element arranged on a supporting structure of said low and medium voltage electrical cabinet.

12. A low voltage enclosure comprising:

- at least one door, the at least one door further comprising at least one lock assembly, said at least one lock assembly comprising:
- a containment profile that develops along a main direction defining a seat;
- a mechanism housed in said seat, wherein said mechanism comprises at least one rod and at least one guide element for said at least one rod, wherein said at least one guide element is rigidly connected to said containment profile via at least one first connector; and
- at least one second connector configured to fix said lock assembly to said door following a connection of said at least one guide element to said containment profile,
- wherein said at least one second connector is integral with said at least one guide element, and
- wherein said at least one second connector is configured as a snap-fit connector which engages opposite edges of a slot formed through said door.

13. The low voltage enclosure according to claim 12, wherein the first connector comprises a snap-fit connector.

14. The low voltage enclosure according to claim 12, wherein said containment profile comprises a curved portion and two flat portion that develop on a same plane from opposite regions of said curved portion, said flat portions being separated so that an opening is defined therebetween for insertion of said mechanism in said seat.

15. The low voltage enclosure according to claim 14, wherein said opening comprises at least one enlargement for the insertion of said at least one guide element of said at least one rod.

16. The low voltage enclosure according to claim 12, wherein said mechanism comprises a first rod, a second rod, and a third rod that connects the first rod to the second rod, wherein the first rod and the second rod comprise a through slot defined close to an end closest to said third rod, said through slot configured so as to be engaged by a bent end of said third rod.

17. The low voltage enclosure according to claim 12, wherein said mechanism comprises a plurality of guide elements for each of said at least one rod.

18. The low voltage enclosure according to claim 12, wherein said at least one said guide element comprises a body defining a longitudinal cavity through which said rod is inserted, said body comprising first surfaces that make it and said rod mutually slidable after their placement in said seat of said containment profile, said body comprising second surfaces that guide laterally said rod with respect to said body, and vice versa.

* * * * *